United States Patent [19]

Hanaki et al.

[11] Patent Number: 5,047,702

[45] Date of Patent: Sep. 10, 1991

[54] SYNCHRONOUS CONTROL METHOD AND APPARATUS THEREFOR

[75] Inventors: Yoshimaro Hanaki; Masayuki Nashiki, both of Aichi, Japan

[73] Assignee: Kabushiki Kaisha Okuma Tekkosho, Aichi, Japan

[21] Appl. No.: 513,818

[22] Filed: Apr. 25, 1990

[30] Foreign Application Priority Data

Apr. 27, 1989 [JP] Japan ................. 1-108468

[51] Int. Cl.⁵ .............................. G06F 15/46
[52] U.S. Cl. ..................... 318/625; 318/571;
       318/572; 364/474.11; 364/474.14
[58] Field of Search ............... 318/430–434,
       318/560–640, 60–89; 364/148, 474.13–474.28,
       474.11

[56] References Cited

U.S. PATENT DOCUMENTS

| | | | |
|---|---|---|---|
| 4,066,942 | 1/1978 | Bardwell et al. | 318/434 |
| 4,182,979 | 1/1980 | Douglas et al. | 318/434 |
| 4,346,444 | 8/1982 | Schneider et al. | 318/571 X |
| 4,414,495 | 11/1983 | Sumi et al. | 318/571 |
| 4,561,058 | 12/1985 | McMurtry | 318/572 X |
| 4,571,687 | 2/1986 | Fukuyama et al. | 318/571 X |
| 4,602,540 | 7/1986 | Murofushi et al. | 318/593 X |
| 4,617,635 | 10/1986 | Shimizu | 318/571 X |
| 4,659,976 | 4/1987 | Johanson | 318/434 X |
| 4,713,593 | 12/1987 | Rodi et al. | 318/572 |
| 4,862,380 | 8/1989 | Kawamura et al. | 318/625 X |
| 4,879,660 | 11/1989 | Asakura et al. | 318/571 X |
| 4,904,911 | 2/1990 | Toyoda et al. | 318/434 X |

Primary Examiner—Paul Ip
Attorney, Agent, or Firm—Wenderoth, Lind & Ponack

[57] ABSTRACT

During synchronous control, a first servo motor controls a position of a first spindle system and a second spindle system having a second servo motor makes calculations for estimating the torque required for the second servo motor and gives a command, so that, when a rotational phase difference between the two servo motors exceeds a predetermined value, the rotational phase difference is made equal to zero by a rotational phase difference signal. A torque command to the first servo motor, an inertia ratio between the first and second servo motors, the rotational resistance of the two spindle systems and so on are input to a torque estimator which makes calculations for estimating the torque required for the second servo motor. The estimated torque is used to control the second servo motor. The two servo motors thus generate the appropriate torque when a work held between the two spindle systems is processed. It is therefore possible to significantly reduce the torsional torque applied to the work. In addition, since the rotational phase difference between the two servo motors of two spindle systems is reduced, synchronous control with high precision can be effected even if the work has a low rigidity.

6 Claims, 3 Drawing Sheets

SYNCHRONOUS CONTROL METHOD AND APPARATUS THEREFOR

BACKGROUND OF THE INVENTION

The present invention relates to a synchronous control method and an apparatus therefor which are suitable for a case where a work which is held between two opposed spindles in an opposed spindle lathe is synchronously rotated, the two spindles being opposed to each other and rotatably provided.

In such an opposed spindle lathe having two spindles which are opposed to each other and rotatably provided, when a work is subjected to adjustable-speed rotation or cutting work while being held between the two opposed spindles, the two spindles must be synchronously controlled so that no excessive torsional torque occurs in the work. This synchronous control can be realized by a first method of precisely controlling both spindles so that torsional torque is no greater than an allowable value or by a second method disclosed in Japanese Laid-open Patent Application Nos. 2843/1989 and 2844/1989.

In the first conventional method, when both spindles and the work have a high rigidity, torsional torque excessively occurs in the work even if only a slight deviation occurs in synchronization, and power is transmitted from one spindle driving servo motor to the other spindle driving servo motor. This causes unnecessary power running or regenerative operation of both servo motors and thus causes an unnecessary current to flow to both servo motors and the driving apparatus therefor, resulting in the occurence of a trouble in the control.

In the second conventional method, one spindle driving servo motor is rotated with a given torque, and the other spindle driving servo motor is rotated with a torque which is smaller than the given torque. However, since this method is based on the assumption that there is a difference in torque between both spindles, the torsional torque occurs in the work, and, particularly, there is a problem with respect to the precision of synchronous control when the work has a low level of torsional rigidity.

SUMMARY OF THE INVENTION

The present invention has been achieved in consideration of the above-mentioned situation, and it is an object of the present invention to provide a synchronous control method and an apparatus therefor which are capable of controlling two spindles so that only a small torsional torque is applied to a work, and a difference between the positions of the two spindles is no greater than an allowable value.

According to one aspect of the present invention, for achieving the objects described above, there is provided a method of synchronously controlling the two spindles rotatably provided and opposed to each other in an opposed spindle lathe when a work is held between said two spindles, said method comprising the steps of controlling first and second control objects by first and second servo motors using first and second driving apparatuses so that, when said first and second control objects are mechanically combined, controlling the position or speed of said first control object is controlled by said first servo motor, and applying the torque command, for torque control, formed by the control of said first servo motor to said second driving apparatus from said second servo motor.

According to another aspect of the present invention, there is provided a synchronous control apparatus for an opposed spindle lathe having two spindles which are rotatably provided and opposed to each other, said apparatus comprising a torque estimating means for estimating a torque command to one servo motor on the basis of the torque command formed by control of the other servo motor so as to control the torque.

The nature, principle and utility of the invention will become more apparent from the following detailed description when read in conjunction with the accompanying drawings.

DESCRIPTION OF THE PREFERRED EMBODIMENT

An embodiment of the present invention is described below with reference to the drawings.

Figure 1:
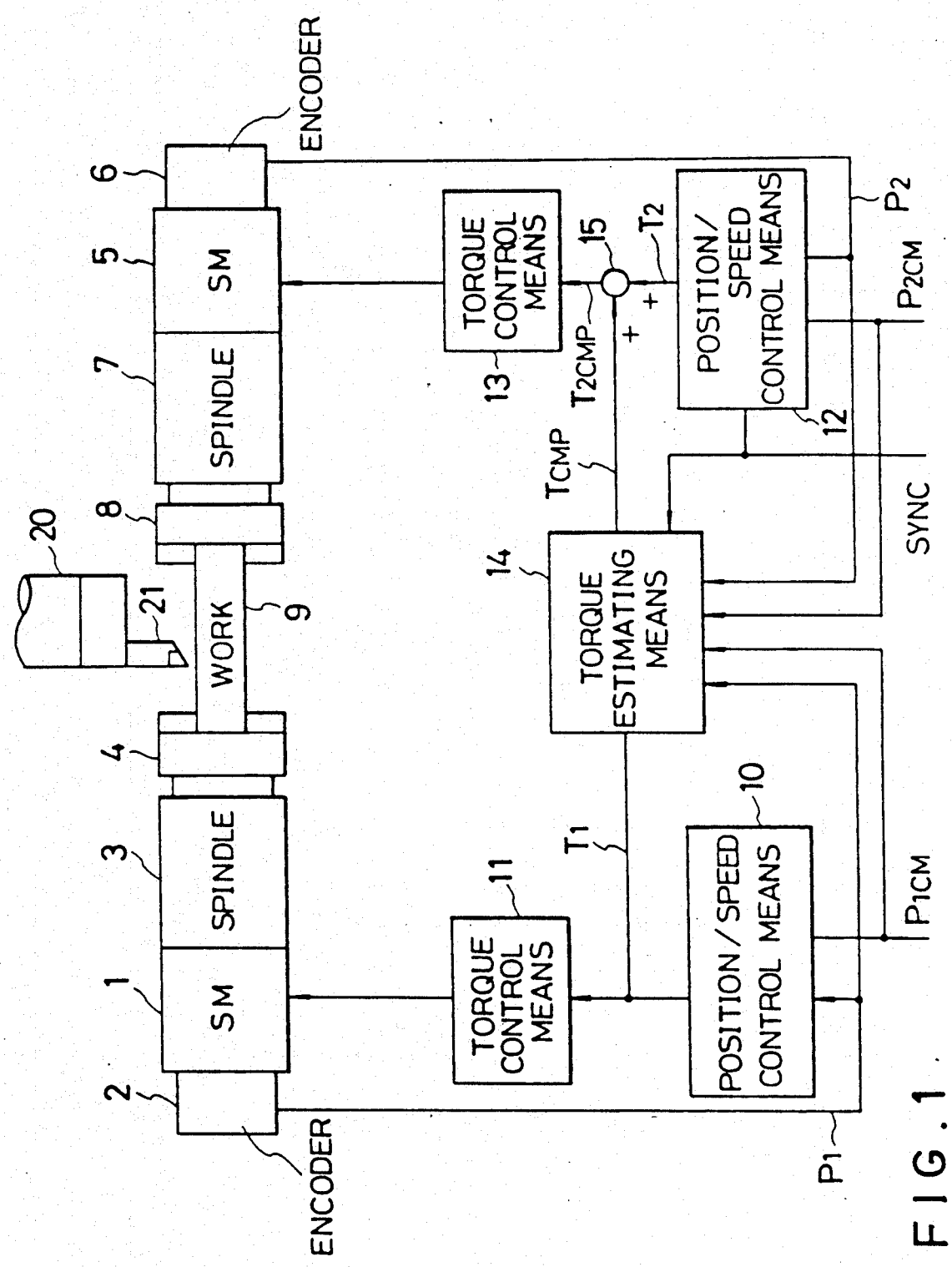
FIG. 1 is a diagram of the control block in an example of opposed spindle lathes to which the present invention can be applied.

FIG. 1 is a block diagram of am example of control apparatuses for opposed spindle lathes to which the present invention can be applied. An encoder 2 and a first spindle 3 are connected to a first servo motor 1, the first spindle 3 being provided with a chuck 4. An encoder 6 and a second spindle 7 are connected to a second servo motor 5, the second spindle 7 being provided with a chuck 8. The chuck 4 of the first spindle 3 is opposite to the chuck 8 of the second spindle 7. A cutting tool 21 is fixed to a tool rest 20, and the position or the speed of the first servo motor 1 is detected by a position/speed control means 10 through the encoder 2. A position command $P_{1CM}$ to the first servo motor 1 and the position signal $P_1$ generated from the encoder 2 are input to the position/speed control means 10 which calculates and outputs a torque command $T_1$. The torque command $T_1$ is input to a torque control means 11 for the first servo motor 1 from the position/speed control means 10 so that electric power is amplified and then supplied to the first servo motor 1 from the torque control means 11. The position or the speed of the second servo motor 5 is detected by a position/speed control means 12 through the encoder 6. A position command $P_{2CM}$ to the second servo motor 5 and a position detection signal $P_2$ generated from the encoder 6 are input to the position/speed control means 12 which calculates and outputs a torque command $T_2$. In this way, the positions or speeds of the two spindles 3 and 7 of the opposed spindle lathe are generally independently controlled.

As shown in FIG. 1, when the work 9 is delivered while being held between the chucks 4 and 8, or when the work 9 is subjected to a cutting work using the cutting tool 21 fixed to the tool rest 20, if the spindles 3 and 7 are not synchronously controlled with a high precision, a high torsional torque occurs in the work 9, this causing a trouble with respect to the work precision or the control of the servo motors.

It is an object of the present invention to synchronously control the spindles 3 and 7 without applying excessive torsional torque to the work 9 so that rotational phase error of the spindles 3 and 7 is small in the above-described case. Specifically, the torque command $T_1$, position command $P_{1CM}$ and position detection signal $P_1$ for the first servo motor 1 and the position command $P_{2CM}$, the position detection signal $P_2$ and synchronous operation signal SYNC for the second servo motor 5 are input to the torque estimating means 14 which makes calculations for estimating the desired torque of the second servo motor 5 and outputs the estimated desired to as a torque command $T_{CMP}$ to the second servo motor 5 to an addition means 15. The torque command $T_{2CMP}$ resulting from addition of $T_2$ to $T_{CMP}$ in the addition means 15 is fed to a torque control means 13.

During the synchronous control, the synchronous operation signal SYNC is in an on-state wherein the torque estimating means 14 is operated, and the torque command $T_2$ of the position/speed control means 12 for the second servo motor 5 is zero. Contrary to this, when the synchronous operation signal SYNC is in an off-state, the output $T_{CMP}$ of the torque estimating means 14 is zero, and the position/speed control means 12 is operated.

Figure 2:
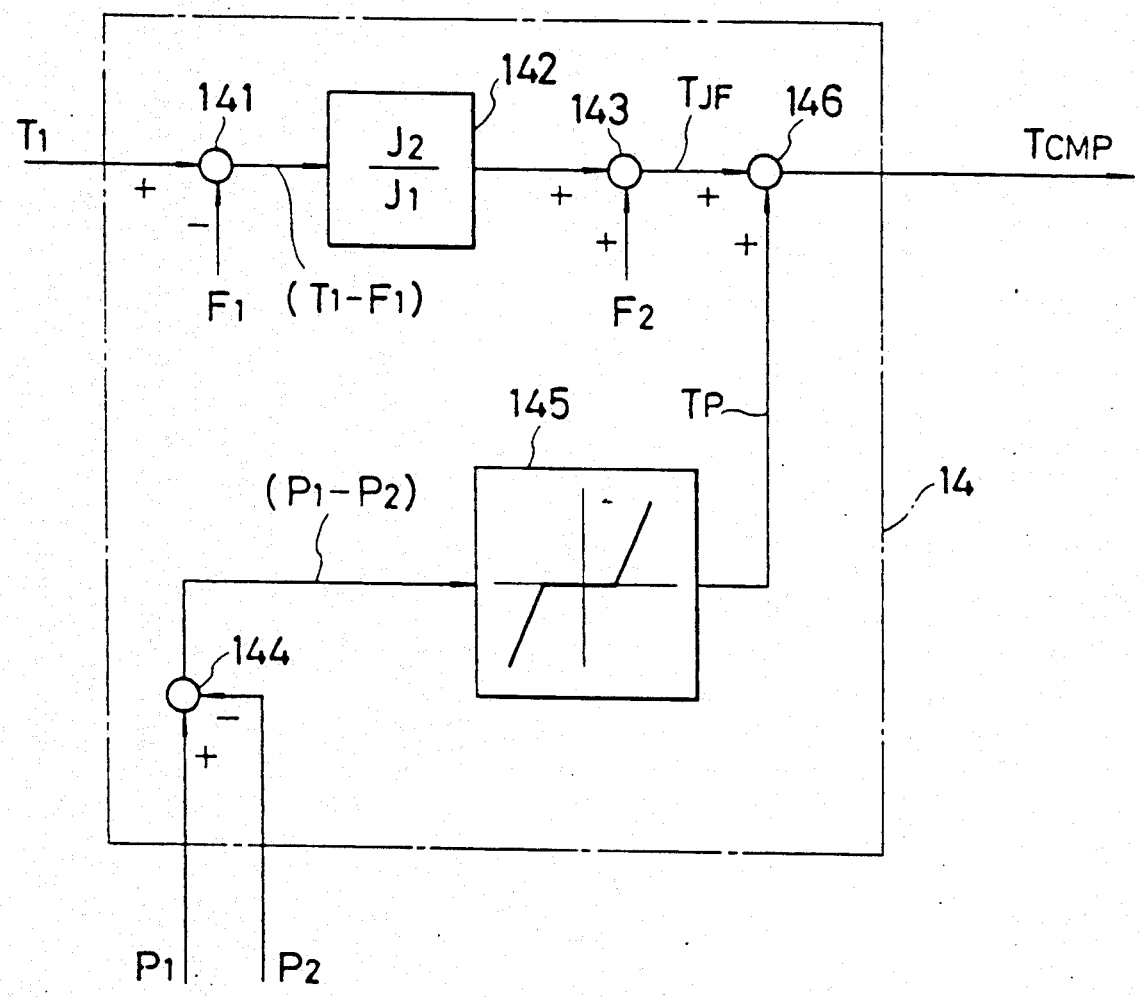
FIG. 2 is a block diagram in an embodiment of a means for estimating torque.

A typical embodiment of the torque estimating means 14 is described below with reference to FIG. 2.

The rotational resistance $F_1$ of the first spindle system is first subtracted from the torque command $T_1$ to the first servo motor 1 by a subtracter 141. The subtraction result $(T_1 - F_1)$ is multiplied by the inertia ratio $J_2/J_1$ between the first and second spindle systems by a coefficient means 142. The multiplication result is added to the rotational resistance $F_2$ of the second spindle system by an adder 143 to obtain a torque command $T_{JF}$. On the other hand, a difference signal $(P_1 - P_2)$ between the position detection signals $P_1$ and $P_2$ is obtained by a subtracter 144. A position correcting torque command $T_P$ is determined by a position error signal generator 145 which outputs a predetermined function signal if the difference signal $(P_1 - P_2)$ is over a predetermined value. The position correcting torque command $T_P$ is added to the torque command $T_{JF}$ by an adder 146 to generate the torque command $T_{CMP}$ to the second servo motor 5.

Figure 3:
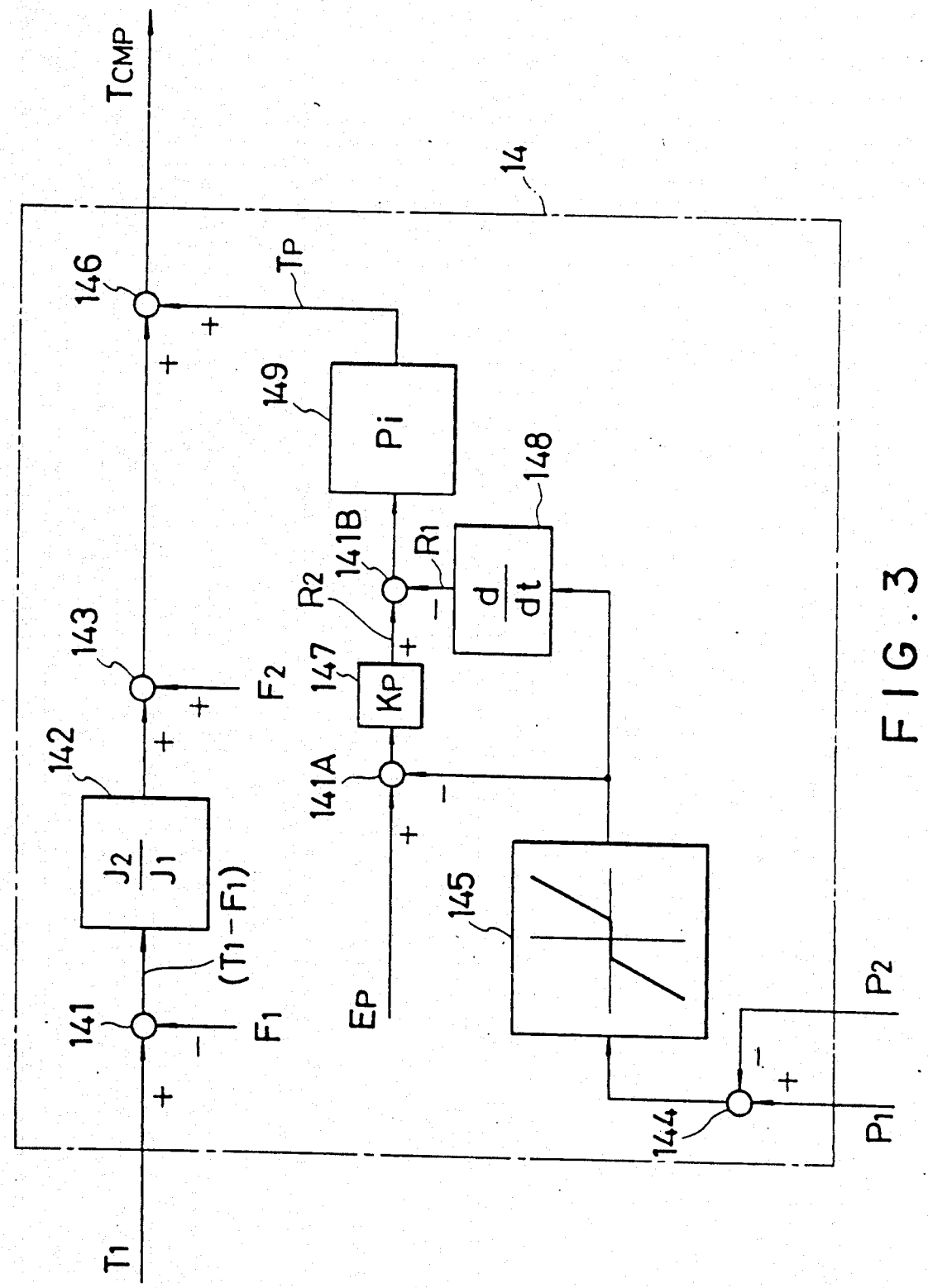
FIG. 3 is a block diagram in another embodiment of means for estimating torque.

Another embodiment of the torque estimating means 14 is described below with reference to FIG. 3 corresponding to FIG. 2. A difference between the command signal $E_P$ of the difference in rotational phase between the two servo motors, which is generally zero, and the output of the position error signal generating means 145 is determined by a subtracter 141A. The difference is multiplied by a proportional coefficient $K_P$ in a coefficient means 147 to determine a relative speed command $R_2$. On the other hand, the output from the position error signal generating means 145 is input to a differentia for means 148 and differentiated so as to thereby determine a relative speed $R_1$ between the two servo motors. The relative speed $R_1$ is input to a subtracter 141B in which a difference $(R_2 - R_1)$ from the relative speed command $R_2$ is determined. The difference $(R_2 - R_1)$ is input to a proportional integration means 149 in which the position correcting torque command $T_P$ is compensated by proportional integration. In this way, the position correcting torque command $T_P$, which enables precise relative position control or relative speed control on the basis of the difference in rotational phase between the two servo motors, is determined. The position correcting torque command $T_P$ is added to the value of the torque command $T_{JF}$ in an adder 146 to determine the torque command value $T_{CMP}$ for the second servo motor 5.

If the torque command value for the first servo motor 1 is subtracted from the position correcting torque command $T_P$ so as to avoid saturation of the output of the second servo motor 5 and the driving apparatus therefor, it is possible to control the relative position or the relative speed between the two servo motors.

As described above, in the present invention, the position of the first servo motor is controlled during synchronous control, and the torque required for the second servo motor is precisely estimated by calculations on the basis of the result of the position control. Thus, no excessive torsional torque is applied to the work, and there is no trouble in control that most of the power of one of the two servo motors is transmitted to the other servo motor. In addition, since the rotational phase difference between the two servo motors can be significantly reduced even if the work has very low rigidity, it is possible to make high-precision synchronous control or high-precision cutting. Namely, the two spindles of the opposed spindle lathe can be synchronously operated with high precision.

It should be understood that many modifications and adpatations of the invention will become apparent to those skilled in the art and it is intended to encompass such obvious modifications and changes in the scope of the claims appended hereto.

What is claimed is:

1. A method of synchronously controlling first and second spindles which are rotatably provided and opposed to each other in an opposed spindle lathe when a work is held between the first and second spindles, the method comprising the steps of: respectively driving the first and second spindles by first and second servo motors using respective first and second driving apparatuses controlling one of the rotational position and speed of the first spindle by the first servo motor, and generating and applying a torque command, for torque control, to said second driving apparatus for said second servo motor the torque command generated in accordance with another torque command applied to the first driving apparatus for the first servo motor.

2. A synchronous control method according to claim 1, wherein the torque command is varied in accorance with one of an inertia, a frictional torque, an acceleration of said first servo motor and first spindle and the second motor and second spindle, and the varied torque command is input to the second driving apparatus.

3. A synchronous control method according to claim 2, wherein, if a detected speed difference or position difference between the first and second servo motors exceeds a predetermined value, the speed or position of the second servo motor is controlled in accordance with the detected speed or position difference.

4. A synchronous control apparatus for an opposed spindle lathe having two spindles which are rotatably provided and opposed to each other, said apparatus comprising: first and second spindle systems respectively driven by first and second servo motors; a torque estimating means for estimating a torque command for one of said first and second servo motors on the basis of a torque command for the other of said first and second servo motors; feeding said estimated torque command to said one of said first and second servo motors so as to control the torque.

5. A synchronous control apparatus according to claim 4, wherein said torque estimating means comprises: a first subtracter for subtracting a rotational resistance of said first spindle system from a torque command to said first servo motor; a coefficient means for multiplying the result of subtraction in said first subtracter by an inertia ratio between said first and second spindle systems; a first adder for adding the output from said coefficient means to the rotational resistance of said second spindle system; a second subtracter for determining a difference between the position detection signals output from said first and second spindle systems; a position error signal generating means for outputting a predetermined functional signal if the output from said second subtracter exceeds a predetermined value, and a second adder for adding the result of addition in said first adder to the output from said position error signal generating means.

6. A synchronous control apparatus according to claim 4, wherein said torque estimating means comprises: a first subtracter for subtracting a rotational resistance of said first spindle system from a torque command to said first servo motor; a first coefficient means for multiplying the result of subtraction in said first subtracter by an inertia ratio between said first and second spindle systems; a first adder for adding the output from said first coefficient means to a rotational resistance of said second spindle system; a second subtracter for determining a difference between the position detection signals output from said first and second spindle systems, a position error signal generating means for outputting a predetermined function signal if the output from said second subtracter exceeds a predetermined value; a third subtracter for determining a difference between the command signal of the difference in rotational phase between said first and second servo motors and the output from said position error signal generating means; a second coefficient means for multiplying the output from said third subtracter by a proportional coefficient; a differentiating means for differentiating the output from said position error signal generating means; a fourth subtracter for determining a difference between the output from said second coefficient means and the output from said differentiating means; a proportional integrating means for compensating for the output from said fourth subtracter by proportional integration, and a second adder for adding the result of addition in said first adder to the output from said proportional integrating means.

* * * * *